US007322104B2

(12) United States Patent
Koyama et al.

(10) Patent No.: US 7,322,104 B2
(45) Date of Patent: Jan. 29, 2008

(54) METHOD FOR PRODUCING AN INK JET HEAD

(75) Inventors: Shuji Koyama, Kawasaki (JP); Shingo Nagata, Machida (JP); Kenji Fujii, Hiratsuka (JP); Masaki Osumi, Yokosuka (JP); Jun Yamamuro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 11/157,762

(22) Filed: Jun. 21, 2005

(65) Prior Publication Data

US 2005/0285905 A1 Dec. 29, 2005

(30) Foreign Application Priority Data

Jun. 25, 2004 (JP) ............................ 2004-188889

(51) Int. Cl.
*B21D 53/76* (2006.01)
*G01D 15/00* (2006.01)

(52) U.S. Cl. ........................ 29/890.1; 29/832; 29/835; 29/845; 29/611; 216/27; 216/41; 216/67; 216/99

(58) Field of Classification Search ............... 29/890.1, 29/832, 831, 835, 845, 611, 612, 844, 846; 216/27, 41, 67, 99; 347/61, 47, 68–70, 85, 347/95; 438/21
See application file for complete search history.

(56) References Cited

U.S. PATENT DOCUMENTS 5,169,806 A * 12/1992 Hawkins et al. .............. 438/21
5,658,471 A * 8/1997 Murthy et al. ................ 216/27
6,137,443 A * 10/2000 Beatty et al. ................. 347/63
6,137,510 A 10/2000 Sato et al.
6,139,761 A 10/2000 Ohkuma
6,143,190 A 11/2000 Yagi
6,162,589 A * 12/2000 Chen et al. ................. 430/320

* cited by examiner

*Primary Examiner*—A. Dexter Tugbang
*Assistant Examiner*—Tai Van Nguyen
(74) *Attorney, Agent, or Firm*—Canon U.S.A. Inc I.P. Div

(57) ABSTRACT

An ink jet head includes a substrate having a flow path construction member constructing a plurality of discharge ports for discharging ink and a plurality of ink flow paths corresponding thereto, and a plurality of energy generating elements corresponding to the plurality of discharge ports. The substrate has an ink supply port for supplying ink to the ink flow paths. The ink supply port includes a first liquid chamber disposed on a plane on which the energy generating elements are formed, and having a grooves with island-shaped columns left, and a second liquid chamber disposed on the opposed plane, and having a plurality of through holes partitioned at positions corresponding to the island-shaped columns. In the ink jet head, the island-shaped columns and a partition wall for the through holes are left as a beam construction section, thereby improving a mechanical strength of a semiconductor substrate. Also, the first liquid chamber has a groove with island-shaped columns left, thereby enabling ink to be adequately supplied from the ink supply port to the discharge ports.

7 Claims, 9 Drawing Sheets

METHOD FOR PRODUCING AN INK JET HEAD

BACKGROUND OF THE INVENTION

1. Field of the Invention

The present invention relates to a method for producing an ink jet recording head which discharges ink to record on a recording medium, an ink jet recording head, and a substrate for an ink jet recording head.

2. Description of the Related Art

There has been conventionally known an ink jet recording head (hereinafter simply referred to as "recording head") which discharges ink as ink droplets through discharge ports while subjecting the ink to thermal energy. Sectional views of FIGS. 1A and 1B illustrate a general recording head of this kind. In FIGS. 1A and 1B, the recording head 150 has an orifice plate 105 on which a plurality of discharge ports 107 are formed for discharging ink, and a substrate 101 on which energy generating elements (not shown) are formed for applying thermal energy to the ink. The substrate 101 has ink flow paths 106 for supplying the ink to a plurality of the discharge ports 107, and a common liquid chamber 108 for supplying liquid to the ink flow paths 106. To dispose the common liquid chamber 108 in the substrate 101 it is necessary to form an ink supply port 110 on a surface opposed to a surface (an obverse surface of the substrate) on which the energy generating elements are formed. Moreover, as disclosed in U.S. Pat. No. 6,137,510, reinforcing ribs may be, though not shown in FIG. 1, disposed at a center portion of the orifice plate 105 in the longitudinal direction so as to correspond to the ink supply port 110.

As a method of forming an ink supply port in the recording head shown in FIG. 1, there have been known a method using an anisotropic etching technique disclosed in U.S. Pat. No. 6,139,761, and a method for mechanically forming an aperture using sandblasting and drilling and the like. Among these methods, using an anisotropic etching technique is an excellent method because it has the following advantages:

(1) The ink supply port can be precisely formed compared with the other methods (Particularly in U.S. Pat. No. 6,139,761, since the method disclosed forms the ink supply port after the flow path shaping member such as the orifice plate is formed, the position relationship between the discharge ports or the ink flow paths and the supplying ports can be made very precise).

(2) It is capable of dealing with various kinds of ink since the formed surface of the wall is alkali-resistant.

In order to improve the accuracy of an opening of the ink supply port on a side of an obverse surface of the substrate when using the above method, a method for producing an ink jet head is disclosed in U.S. Pat. No. 6,143,190 in which an embedded dummy layer is disposed in a silicon substrate.

The above-mentioned method for producing an ink jet recording head is a very excellent method, hence is in practical use; however, in the recording head shown in FIG. 1, the more the number of the discharge ports 107, the longer the silicon substrate 101. In thus produced elongated ink jet recording head comprising a multitude of discharge ports arranged in a line for discharging ink (hereinafter simply referred to as "elongated head"), a single elongated ink supplying port 110 is disposed in the silicon substrate 101 at its center portion, which unfavorably reduces its mechanical strength. Such a problem occurs similarly in the case of reducing the size of the silicon substrate 101 for the purpose of cutting the producing cost; namely, the smaller the substrate, the less its mechanical strength.

The reduction of the mechanical strength of the silicon substrate causes the silicon substrate 101 to be relatively easily deformed. If such an elongated head is produced using the conventional producing method as it is, the deformation of the substrate possibly causes problems that the orifice plate 105 is unstuck from the silicon substrate 101, or the orifice plate 105 is deformed. Accordingly, the deformation of the orifice plate 105 causes the discharge ports 107 formed on the orifice plate 105 to be out of alignment in its position and opening direction, which also may reduce the recording quality. Moreover, using the silicon substrate 101 having reduced mechanical strength increases the likelihood that the silicon substrate 101 is unfavorably damaged in its producing process, which may cause reduction of the production yield.

Consequently, the inventors have made an investigation to improve the mechanical strength of the silicon substrate by a method as simple as possible, but there is concern that simply dividing the ink supply port into plural number of ink supply ports and disposing beams therebetween may possibly decrease the opening area on the obverse surface of the substrate due to the characteristic of anisotropic etching, and causes the ink supplying characteristic to be fluctuated according to the ink flow paths.

SUMMARY OF THE INVENTION

The invention has been made to solve the above-mentioned technical problems, and is directed to an ink jet recording head producing method which is capable of improving the mechanical strength without requiring a special process and a special reinforcing member, even if an ink supply port is constructed in a substantially elongated manner. Further, the invention is directed to an ink jet recording head and a substrate for the head which are improved in mechanical strength and do not have fluctuations in ink supply characteristic depending on ink flow paths.

In one aspect of the invention, a method for producing an ink jet head is disclosed. The ink jet head includes a plurality of discharge ports for discharging ink, a plurality of ink flow paths for respectively supplying ink to the plurality of discharge ports, and an ink supply port for supplying ink to the plurality of ink flow paths. The ink jet head discharges ink supplied from the ink supply port through the plurality of discharge ports using a plurality of energy generating elements. The method for producing the ink jet head includes the steps of: providing a substrate having a first principal plane on which the plurality of energy generating elements, a dummy layer for forming the ink supply port, and a first etching stopper layer surrounded by the dummy layer are formed; forming a second etching stopper layer on a region of the first principal plane corresponding to the ink supply port; forming, on the first principal plane, a flow path construction member for constructing the plurality of discharge ports and the plurality of ink flow paths; placing, on a second principal plane opposed to the first principal plane of the substrate, an etching mask for forming a plurality of through holes, the etching mask being partitioned so as to include a region opposed to the first etching stopper layer; performing etching of the substrate from the second principal plane; and removing the second etching stopper layer after etching step to form the ink supply port, wherein, in the etching step, a groove is formed on the first principal plane, the groove having a region corresponding to the first etching stopper layer corresponding to the dummy layer left in an island-shaped manner, and the groove communicating with a plurality of through holes formed on the second principal plane.

According to the above-mentioned ink jet head producing method, a dummy layer forming process and a common liquid chamber forming process using anisotropic etching, which processes are generally carried out in this kind of a method of producing a substrate for a recording head, can be utilized without change. Therefore, a special process is not needed. Further, since a beam structure is provided by leaving a part of the semiconductor substrate, the mechanical strength of the recording head can be improved without requiring a special reinforcing member. Therefore, even if an ink supply port is constructed in a substantially elongated manner, a method for producing an ink jet head having an excellent mechanical strength without requiring a special process and a special reinforcing member can be provided.

In another aspect of the invention, an ink jet head includes: a flow path construction member constructing a plurality of discharge ports for discharging ink, and a plurality of ink flow paths for respectively supplying ink to the plurality of discharge ports; and a substrate having an ink supply port for supplying ink to the plurality of ink flow paths, and a plurality of energy generating elements corresponding to the plurality of discharge ports, wherein the plurality of energy generating elements are disposed on a first principal plane of the substrate, and wherein the ink supply port includes a first liquid chamber disposed on the first principal plane and having a groove with island-shaped columns left, and a second liquid chamber disposed on a second principal plane opposed to the first principal plane of the substrate and having a plurality of through holes partitioned at positions corresponding to the island-shaped columns.

According to the above-mentioned ink jet head, the island-shaped columns and a partition wall for the through holes are left as a beam construction portion. Therefore, the mechanical strength of the semiconductor substrate can be improved. Also, the first liquid chamber includes a groove with island-shaped columns left. Therefore, ink can be adequately supplied from the ink supply port to the discharge ports.

In a further aspect of the invention, a substrate for a recording head is disclosed in which a plurality of energy generating elements are formed on a first principal plane of a semiconductor substrate so as to be arranged in one direction; and a plurality of common liquid chambers opening to the first principal plane are formed so as to be arranged in the one direction, wherein the plurality of common liquid chambers each include a first liquid chamber opening to the first principal plane of the semiconductor substrate, and a second liquid chamber opening to a second principal plane of the semiconductor substrate, wherein the second liquid chamber has such a shape as to be formed by subjecting the semiconductor substrate to anisotropy etching from the second principal plane, and wherein the first liquid chamber has such a shape as to be formed by subjecting the semiconductor substrate to anisotropy etching from the first principal plane, and an opening portion of the first liquid chamber on the first principal plane is larger than an opening portion which opens on to the first principal plane when the semiconductor substrate is subjected to anisotropy etching from the second principal plane to the first principal plane.

According the above-mentioned substrate for a recording head, a member of the semiconductor substrate between the common liquid chambers adjacent to each other is left as a beam construction section. Therefore, the mechanical strength of the semiconductor substrate can be improved. Further, the opening portions through which the respective common liquid chambers open on the first principal plane (on the side on which a plurality of energy generating elements are formed) function as a substantially single elongated ink supply port. Therefore, ink can be adequately supplied from the common liquid chambers to the discharge ports.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

A First Embodiment

Figure 2:
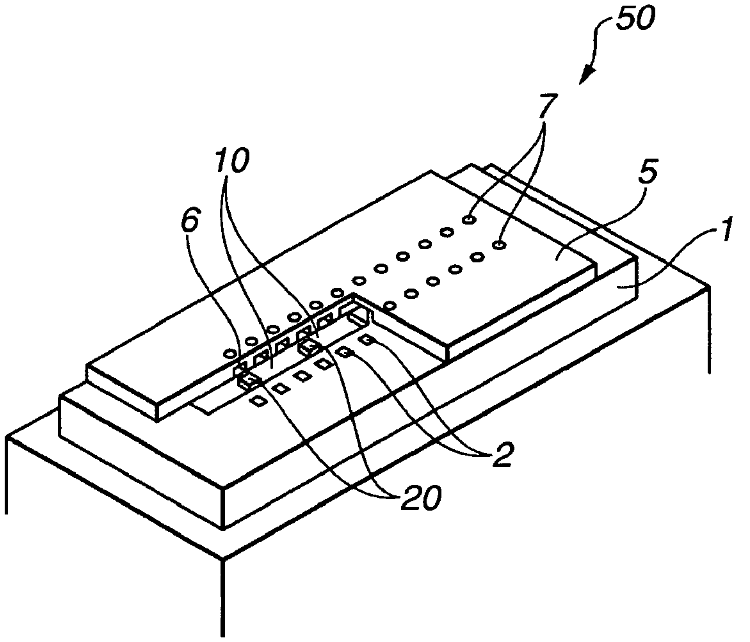
FIG. 2 is a schematic perspective view of a recording head according to a first embodiment of the invention.

FIG. 2 is a schematic perspective view of a recording head according to a first embodiment of the invention.

A recording head 50 of FIG. 2 has a coating resin layer 5 as an orifice plate disposed on a silicon substrate 1. A plurality of discharge ports 7 for discharging ink is arranged in the coating resin layer 5 in an elongated manner in two rows. Also, a plurality of the discharge ports 7 are formed in a longitudinal direction of the silicon substrate 1 and respective pitches of the discharge ports 7 arranged adjacent to each other are constant. Moreover, on the coating resin layer 5 (orifice) are disposed reinforcing ribs (described hereinafter) which are disclosed in U.S. Pat. No. 6,137,510.

Figure 3A:
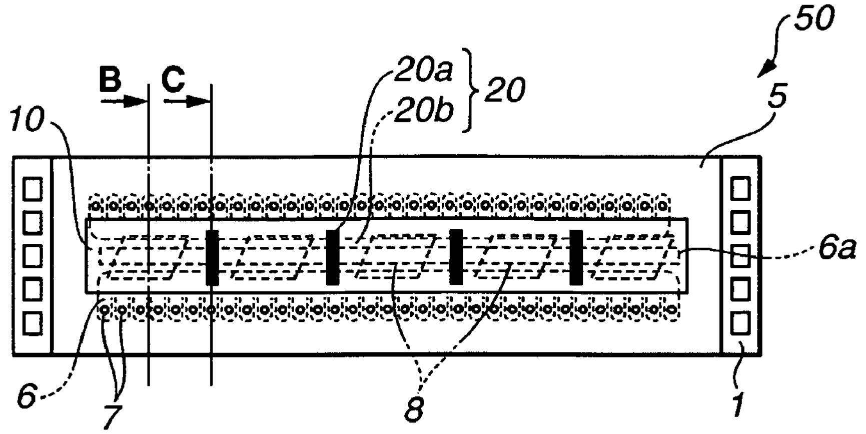
FIG. 3A is a top view of the recording head.
Figure 3B:
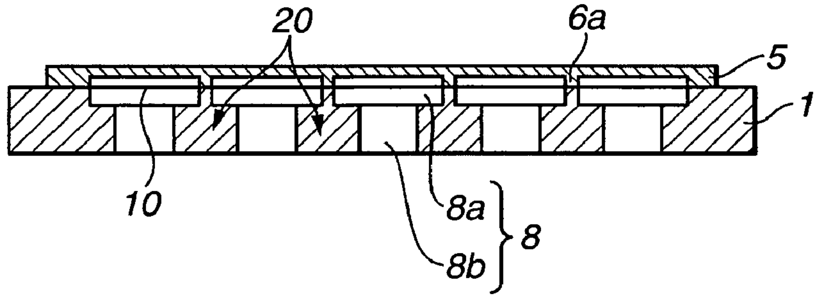
FIG. 3B is a longitudinally cut sectional view of the recording head.

The silicon substrate 1 has a crystal orientation of a <110> plane, and has a plurality of ink supply ports 10 partitioned by a beam constructing section 20 and formed and arranged in a direction of the discharge ports 7. This beam constructing section 20 prevents a mechanical strength of the silicon substrate 1 from lowering, a detail of which will be described below with reference to the drawings. In this embodiment, as shown in FIG. 3B, the reinforcing ribs 6*a* disposed in the coating resin layer 5 has contact with the beam constructing section 20.

Between the coating resin layer 5 and the silicon substrate 1 are formed ink flow paths for transferring ink supplied from the ink supply ports 10 to respective discharge ports 7, as is the case with the conventional recording head. Further, energy generating elements 2 for heating the ink, which comprises an exothermic element, are disposed in the respective ink flow paths 6 at positions opposed to the discharge ports 7.

Thus constructed recording head 50 drives the respective energy generating elements 2 to discharge the ink droplets from the discharge ports 7, as is the case with the conventional recording head.

Figure 4:
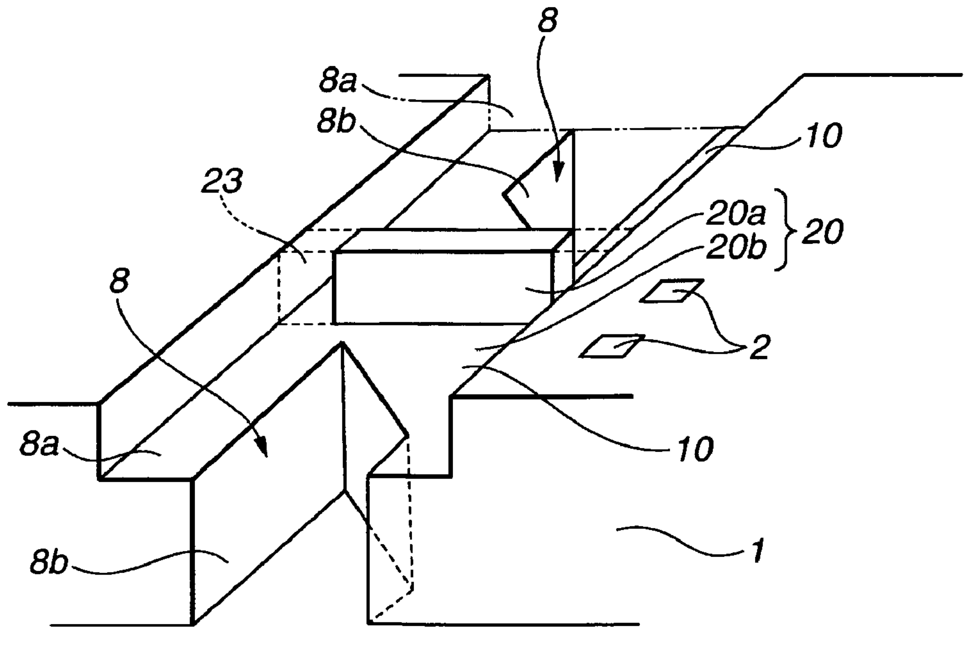
FIG. 4 is an enlarged perspective view of the circumference of a beam constructing section in the recording head of FIG. 2.

Next, the beam constructing section 20 will be described in more detail with reference to FIGS. 3A and 3B, and FIG. 4. FIG. 3A is a top view of the recording head 50, and FIG. 3B is a sectional view of the recording head 50 cut in the longitudinal direction. FIG. 4 is an enlarged perspective view of the circumference of the beam constructing section 20.

As described above, in the silicon substrate 1 are disposed a plurality of common liquid chambers 8, and the beam constructing section 20 is constructed between the common liquid chambers 8 adjacent to each other.

One common liquid chamber 8 is, as shown in FIG. 4, constructed by a lower liquid chamber 8*b* excavated from a side of a reverse surface of the silicon substrate 1, and an upper liquid chamber 8*a* communicated with an upper portion of the lower liquid chamber 8*b* and having an opening to the reverse surface of the silicon substrate 1 as ink supply ports 10. Both of the upper liquid chamber 8*a* and the lower liquid chamber 8*b* are formed by partially removing the silicon substrate 1 by means of anisotropy etching using an alkaline solution.

The lower liquid chamber 8*b* is of a parallelogram in sectional shape (contour) in a plane of the substrate. The sectional shape is maintained constant from the reverse surface of the silicon substrate 1 to a substantial center of the silicon substrate 1 in the thickness direction. The contour of the lower liquid chamber 8*b* is of a parallelogram as described above because the lower liquid chamber 8*b* is formed by subjecting the silicon substrate 101 having a crystal orientation of a <110> plane to anisotropy etching. This contour can be defined according to an opening shape of an etching mask used in the etching.

The upper liquid chamber 8*a* is rectangular in sectional shape (contour) in a plane of the substrate. The sectional shape is maintained constant from the obverse surface toward the reverse surface of the silicon substrate. The contour of the upper liquid chamber 8*a* can be defined according to a contour of a dummy layer formed on the obverse surface of the silicon substrate 1 at the time of its production.

The beam constructing section 20 is made by partially leaving the silicon substrate 1 when forming the common liquid chambers 8, accordingly is made of the same material as the silicon substrate 1. The beam constructing section 20 is constructed by a plate-like section 20*a*, and a base section 20*b* disposed below the plate-like section 20*a*. These beam constructing sections 20 are complementary in shape to the upper liquid chambers 8*a* and the lower liquid chambers 8*b*, respectively.

The plate-like section 20*a* is constructed in a plate-like manner, and is formed between the upper portion liquid chambers 8*a* adjacent to each other and flush with the obverse surface of the silicon substrate 1 at its upper surface. Moreover, the plate-like section 20*a* is made relatively thin, therefore, a plurality of the ink supply ports 10 function substantially as a single ink supply port.

Supposing that the plate-like portion 20*a* has the same thickness as the base portion 20*b*, the distance between the ink supply ports 20 adjacent to each other is unfavorably increased, thereby making the distances from the ink supply port to the respective ink flow paths 8 (e.g., refer to FIG. 2) fluctuate, in other words, the distances up to the respective discharge ports are not uniform, which provides a problem in refilling the ink. However, according to the present embodiment, the plate-like portion 20*a* which is made relatively thin prevents such a problem.

There are etching pits 23 formed on both sides of the plate-like portion 20*a* for communicating the adjacent upper liquid chambers 8*a* with each other. The etching pits 23 are formed as void spaces by partially cutting the beam constructing section 20 on both sides of the plate-like portion 20*a*, and their bottom surfaces are flush with bottom surfaces of the upper liquid chamber 8*a*. Since the etching pits 23 are disposed in such a manner in the recording head 50 according to the present embodiment, the common liquid chambers 8 are communicated with each other although the beam constructing section 20 is formed, therefore the ink can be favorably supplied from the common liquid chambers 8 to the respective ink flow paths 6 (FIG. 3A and FIG. 3B).

The base portion 20*b* serving as a partition wall for a plurality of the thorough holes is formed between the lower liquid chambers 8 adjacent to each other and is flush with the reverse surface of the silicon substrate 1 at its lower surface. The base portion 20*b* is flat at an upper surface, on a part of which is disposed the above-mentioned plate-like portion 20*a* formed like an island-shaped column with the etching pits 23.

According to thus constructed recording head 50 of the present embodiment, since the beam constructing section 20 is disposed so as to separate the common liquid chambers 8 from each other, the mechanical strength of the silicon substrate 1 is improved. Further, even if a plurality of the ink supply ports are formed in a line so as to construct substantially a single elongated ink supply port, the beam constructing section 20 works so that the substrate 1 can not be not easily deformed. Also, the beam constructing section 20 is made of the same material as the silicon substrate 1, thereby eliminating the need for a special reinforcing material. Further, the ribs 6*a* disposed on the coating resin layer 5 (orifice plate) has contact with the beam constructing sections 20, thereby reducing possibility of damaging the coating resin layer 5 even when the layer is subjected to a severe force at center portion.

A Second Embodiment

Referring to FIGS. 5A to 5F through FIGS. 8A to 8F, an example of a method of producing the recording head 50 of the first embodiment is illustrated as a second embodiment according to the invention. FIGS. 5A to 5F are sectional views of the recording head 50 shown in FIGS. 3A and 3B cut along the line B, and FIGS. 6A to 6F are sectional views of the recording head 50 shown in FIGS. 3A and 3B cut along the line c. FIGS. 7A and 7B are perspective views showing the shapes of a dummy layer and a masking member, respectively, which are formed in a process of producing the recording head in FIG. 2. FIGS. 8A to 8E are views which illustrate the formation of a second etching stopper layer in producing the recording head in FIG. 2.

Figure 5A:
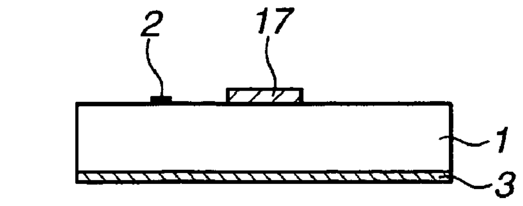
FIGS. 5A to 5F are views which illustrate a method of producing the recording head of FIG. 2 as a second embodiment of the invention.
Figure 6A:
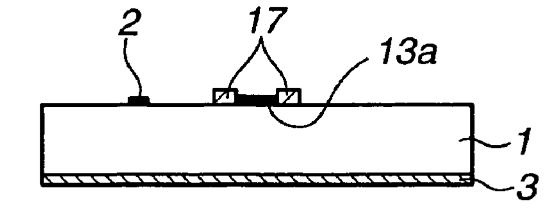
FIGS. 6A to 6F are views which illustrate a method of producing the recording head of FIG. 2.
Figure 7A:
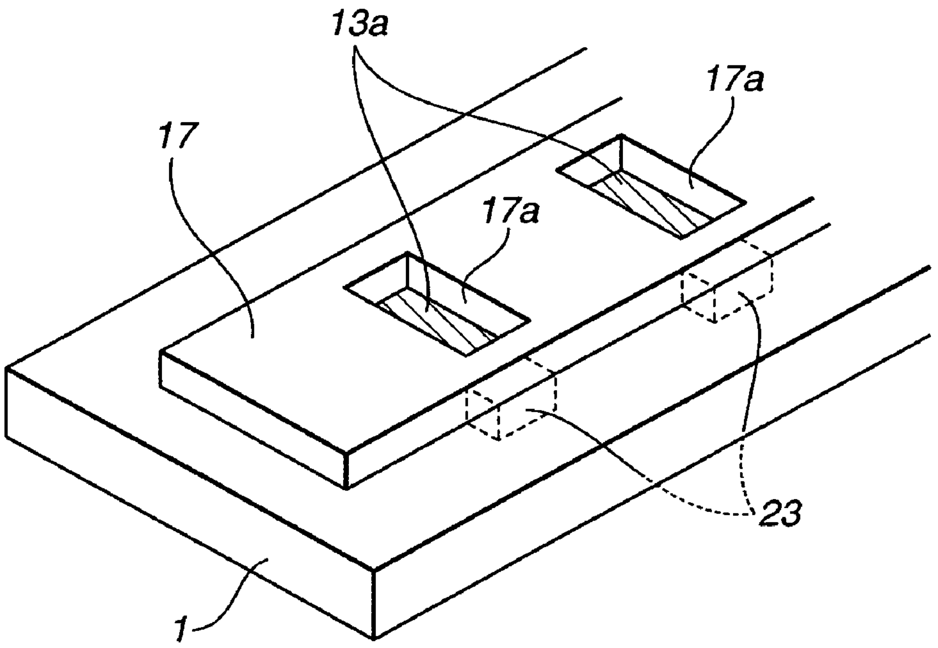
FIGS. 7A to 7B are perspective views showing the shapes of a dummy layer and a masking member formed in a process of producing the recording head in FIG. 2, respectively.
Figure 7B:
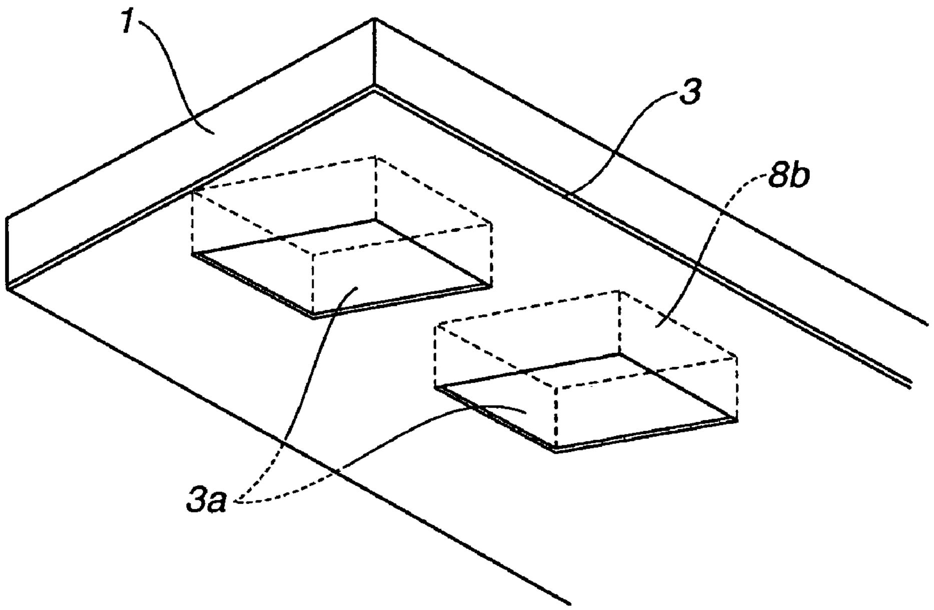

At first, as shown in FIG. 5A and FIG. 6A, a silicon substrate 1 having a crystal orientation of a <110> plane is provided, and a plurality of energy generating elements 2 are formed on an obverse surface of the silicon substrate 1 in a line in a longitudinal direction of the silicon substrate 1, as is the case with the prior art. Further, a thermally oxidized film 3 serving as an etching mask is formed on the entire reverse surface, and a dummy layer 17 is formed on an obverse surface of the silicon substrate 1 and then patterning is carried out.

The dummy layer 17 serves as a member for defining contours of the upper liquid chamber 8*a* and the etching pits 23 as described above; therefore, the contour of the dummy layer 17 corresponds to those of the upper liquid chamber 8*a* and the etching pits 23, as shown in FIG. 7A. Since a portion of the beam constructing section 20 corresponding to the plate-like portion 20*a* need not be subjected to etching at this portion the dummy layer 17 is omitted and an opening portion 17*a* is formed. An oxidized film 13*a* functioning as a first etching stopper layer is formed in the opening portion 17*a* in a process of etching the common liquid chambers 8, as described later.

Further, on an upper surface of the dummy layer 17 is formed a membrane such as a silicon nitride film, etc., functioning as a second etching stopper layer (not shown in FIGS. 5A to 5F, and FIGS. 6A to 6F). This membrane can be formed using the publicly known technique, one example of which will be briefly described below with reference of FIGS. 8A to 8E.

Figure 8A:
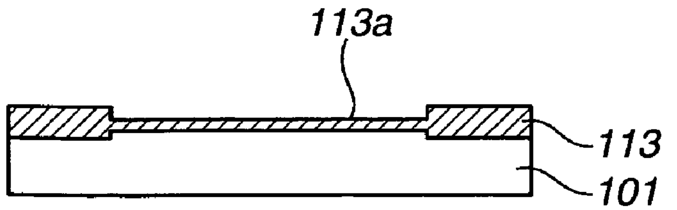
FIGS. 8A to 8E are views which illustrate the formation of a second etching stopper layer in a method of producing the recording head in FIG. 2.
Figure 8B:
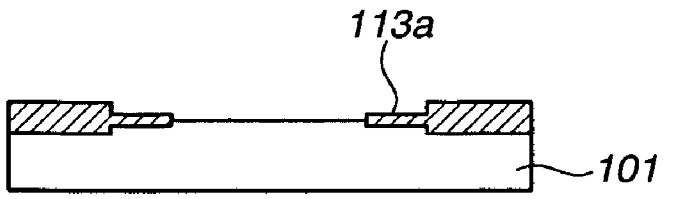
Figure 8C:
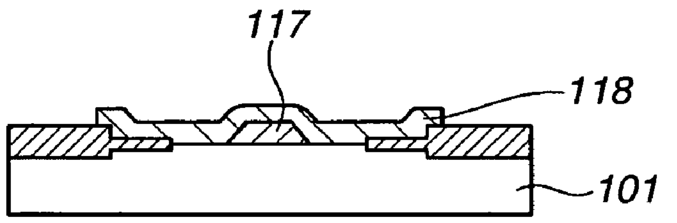
Figure 8D:
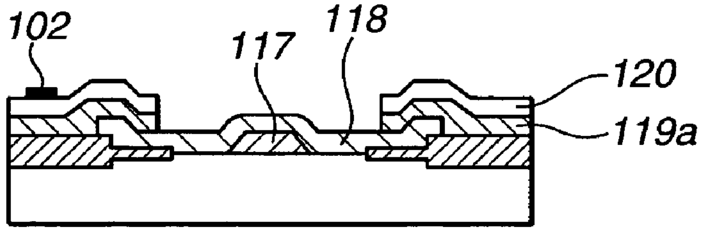

As shown in FIG. 8A, a field oxidized film 113 is formed on the obverse surface of the silicon substrate 101. A silicon nitride (SiN) film (not shown) for controlling the growth of the field oxidized layer 113 is in advance formed on a region of the silicon substrate 101 including a portion where the dummy layer 117 is formed in the later process. Accordingly, the field oxidized layer 113 is not formed on the region, instead a thin oxidized layer 113*a* is formed. Next, as shown in FIG. 8B, the oxidized layer 113*a* is partially removed through patterning to partially expose the silicon substrate 101 in order to form the dummy layer 17 on the silicon substrate 101. Then, as shown in FIG. 8C, the dummy layer 117 is formed in a predetermined shape on the exposed portion of the silicon layer 101 and a silicon nitride layer 118 is formed so as to cover the dummy layer 117. This silicon nitride layer 118 becomes a membrane portion functioning as an etching stopper layer in an etching process in which the common liquid chamber 108 and the dummy layer 117 are removed. Next, as shown in FIG. 8D, a BPSG film 119*a* and a silicon oxidized layer 120 are laminated sequentially as a heat storage layer of the energy generating element 102 to form an energy generating element 102 on the silicon oxidized film 120. Then, a part of the BPSG layer 119*a* and the silicon oxidized film 120 unnecessary for the membrane portion are removed. Next, as shown in FIG. 8E, a protecting nitride film 121 made of silicon nitride is formed on the entire obverse surface of the silicon substrate 101.

Figure 8E:
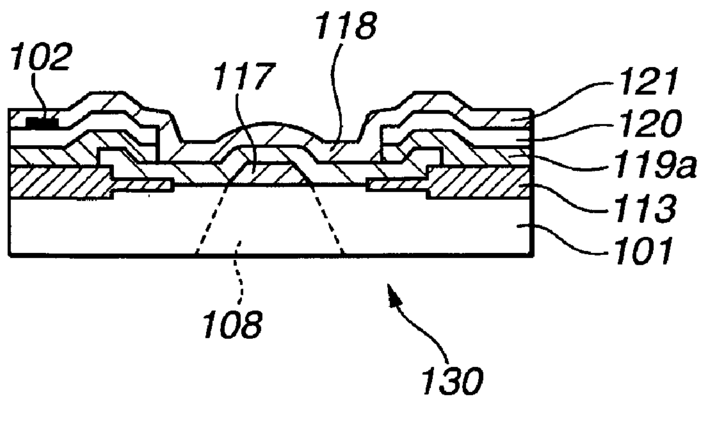

In the present embodiment, the oxidized film 13*a* shown in FIGS. 5A to 5F and FIGS. 6A to 6F is a thin oxidized film formed at the same time as the field oxidized film is formed, and its construction and forming process are the same as the ones described in FIGS. 8A and 8E. Thus, it is preferable to positively use the oxidized film obtained in a process of forming the field oxidized film which is an essential process in a recording head producing of this kind because it is unnecessary to additionally provide an etching stopper layer forming process. Moreover, any other materials may be employed for the dummy layer 117 insofar as it can be subjected to etching using an alkaline solution, just as in the case of FIGS. 8A to 8E; for example, aluminum and poly-silicon can be employed, or aluminum compound such as aluminum silicon, aluminum copper, aluminum silicon copper may be also employed, which is etched faster with respect to an alkaline solution.

Figure 5B:
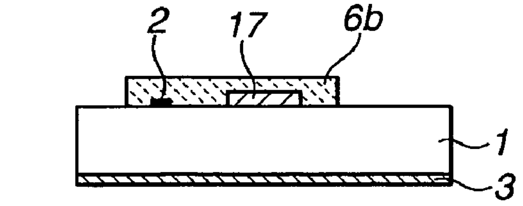
Figure 6B:
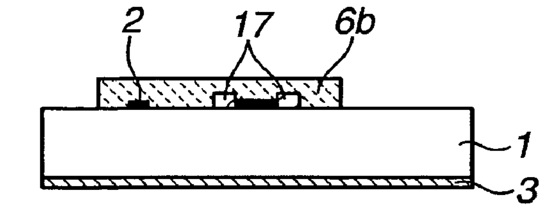

Next, as shown in FIG. 5B and FIG. 6B, a flow path resin layer 6*b* made of the soluble resin material is applied to the obverse surface of the silicon substrate 1 as a material for shaping ink flow paths 6 and patterning is performed according to the contour of the ink flow paths 6.

Figure 5C:
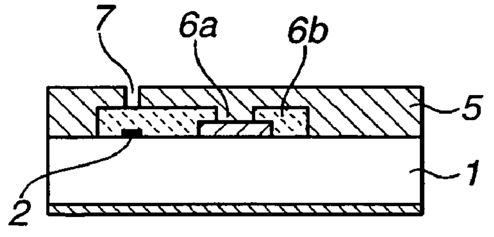
Figure 6C:
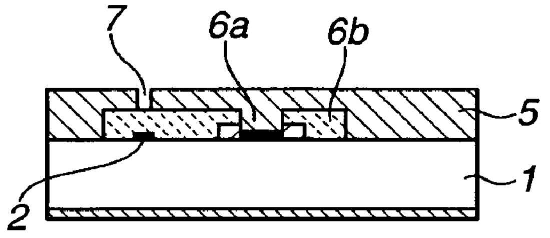

Further, as shown in FIG. 5C and FIG. 6C, the coating resin layer 5 as an orifice plate material is formed on the obverse surface of the silicon substrate 1 so as to cover the flow path resin layer 6*b* and form the discharge ports 7. Moreover, a photosensitive material can be available for the coating resin layer 5.

Figure 5D:
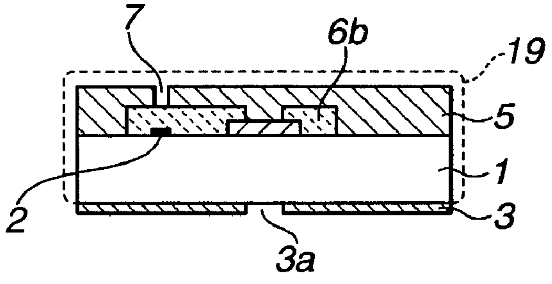
Figure 6D:
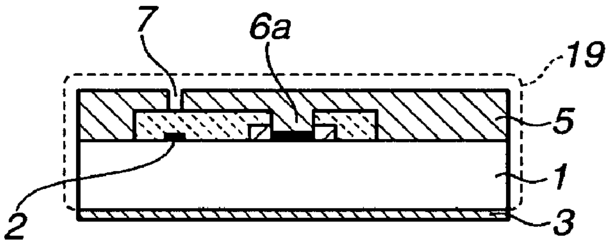

Next, as shown in FIG. 5D and FIG. 6D, opening portions 3*a* are partially formed in the thermally oxidized film 3 which serves as an etching mask. In more detail, a contour of the opening portion 3*a* is of a parallelogram as shown in FIG. 7B. This is because the silicon substrate 1 according to this embodiment has a crystal orientation of a <110> plane, and the characteristic in the etching process is taken into account. The opening portion 3 defines the contour of the lower liquid chamber 8*a* of the common liquid chamber 8 as described above, therefore it has a corresponding shape.

Then, the silicon substrate 1 is covered with a protecting material 19 so that the respective constructing section disposed in the silicon substrate 1 cannot be damaged by the alkaline solution in the etching process.

Figure 5E:
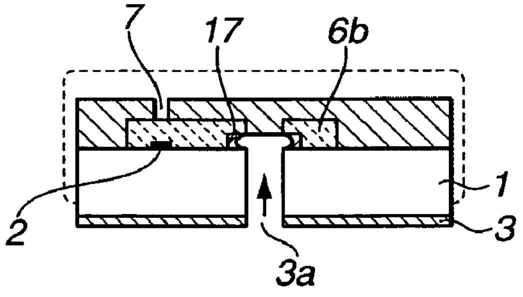
Figure 6E:
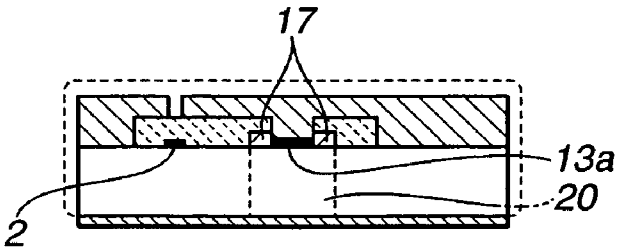

Next, as shown in FIG. 5E and FIG. 6E, the silicon substrate 1 is subjected to anisotropy etching using an alkaline solution with an etching mask of the thermally oxidized film 3 and starts to be partially removed.

At first, the etching carried out at a portion shown by FIG. 5*e* is described below. Since the silicon substrate according to this embodiment has a <110> plane, through holes formed at the time extends in the silicon substrate in its thickness direction, as shown in FIG. 5E, while maintaining almost the same shape as the opening portion 3*a* of the thermal oxidized layer 3, and opens to the obverse surface of the silicon substrate 1 with the shape unchanged. After the through hole has been formed, the dummy layer 17 disposed above the through hole starts to be removed by the alkaline solution. FIG. 5E shows a state in which this dummy layer 17 is being removed. After that, the removal of the dummy layer 17 advances laterally. At this step, the flow path resin layer 6*b* adjacent to the dummy layer 17 cannot be removed because the second etching stopper layer described in detail with reference to FIG. 8A to FIG. 8E is laminated on an upper layer of the dummy layer 17 as described above.

Figure 5F:
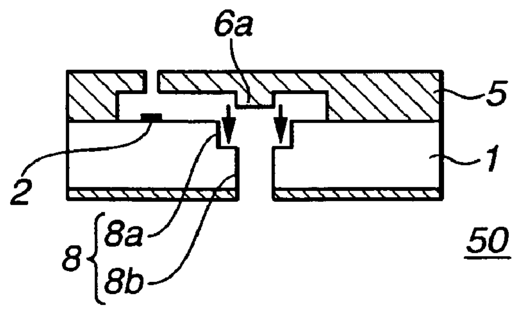

When the dummy layer 17 is almost perfectly removed, thus formed void space is filled with an alkaline solution. Then, as shown in FIG. 5F, this time, the etching progresses toward a side of the reverse surface from the obverse surface of the silicon substrate 1. Due to this etching, the silicon substrate 1 starts to be removed vertically from the obverse surface toward the reverse surface while maintaining the same shape as the contour of the dummy layer 17 (Refer to FIG. 6A to FIG. 7F). After carrying out the etching toward the reverse surface for a predetermined period, the upper liquid chamber 8*a* of the common liquid chamber 8 is formed, which finally provides a common liquid chamber 8 constructed by the upper liquid chamber 8*a* and the lower liquid chamber 8*b*.

Next, the etching carried out at a portion shown by FIG. 6E is described below. At this portion, the opening portions 3*a* are not formed in the thermally oxidized film 3, therefore, the etching from the reverse surface to the obverse surface is not carried out. A member of the dummy layer 17 at this portion is removed after the member of the dummy layer 17 has been removed sideward at a portion of FIG. 5E. FIG. 6E shows a state in which the dummy layer 17 is being removed. Also, at a portion in which the oxidized layer 13*a* is provided, the oxidized layer 13*a* serves as a first etching stopper layer, therefore the silicon substrate 1 is not removed.

Figure 6F:
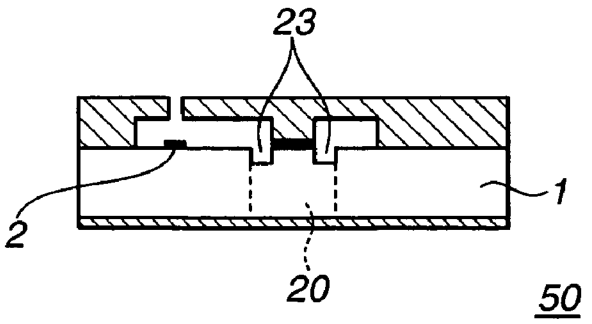

After the dummy layer 17 has been perfectly removed, thus formed void space is filled with an alkaline solution. Accordingly, the silicon substrate 1 is etched from the obverse surface to the reverse surface. After carrying out the etching for a predetermined period of time, the etching pits 23 are formed, as shown in FIG. 6F.

After finishing the above-mentioned etching process, the protecting material 19 is removed, then by dissolving out the flow path resin layer 6*b* from the common liquid chamber 8 the recording head according to the present embodiment is provided.

According to the above-mentioned producing method of the present embodiment, the upper liquid chamber 8*a* and the lower liquid chamber 8*b* of the common liquid chamber 8 are not formed by separate processes, but by only one etching process, which prevents the processes from becoming complicated. In the present embodiment, an etching process for forming common liquid chamber can be utilized which is generally used in producing a recording head of this kind, therefore a special new process is not additionally required. Further, since the dummy layer 17 is shaped as shown in FIG. 7A, in the above-mentioned etching process, the etching pits 23 as well as the common liquid chamber 8 are formed at the same time, therefore a particular process for forming the etching pits 23 is not required. Further, the shape of the common liquid chamber 8 is defined by the opening portion 3*a* of the thermally oxidized film 3 which serves as a etching mask and the dummy layer 17; therefore, only by changing the shapes of the opening portion 3*a* and the dummy layer 17, the shape of the common liquid chamber 8 can be easily changed.

Moreover, while the description is omitted, in the method for producing a ink jet head, a water repellency layer (not shown) made of laminated dry films, for example, may be disposed on a surface of the coating rein layer. Also, among the above-described processes, a process of forming the opening portion 3*a* on the thermal oxidized layer 3 can be implemented using a general technique publicly known for producing a recording head of this kind. For example, a resin layer (not shown) may be formed on the entire surface of the thermal oxidized layer 3 and, the resin layer is subjected to patterning using a photo lithography technique and a dry etching technique, etc. Then, the opening portions 3*a* maybe formed on the thermal oxidized layer 3 by wet etching, etc., in the process shown in FIG. 5D, using the patterned resin layer as a mask. Also, with respect to a process of forming the discharge ports 7, if the coating resin layer 5 is made of an ionizing radiation resolution type photosensitive material of a positive type, it is possible to form the discharge ports 7 using a known technique for carrying out exposure and development with ultraviolet and deep ultraviolet, etc. Further, in the process of dissolving out the flow path resin layer 6*b*, only the development and drying should be carried out after finishing the entire exposure with the deep ultraviolet, and supersonic dipping in development may be carried out if occasion demands. As the alkaline solution used in etching for forming the common liquid chamber 8, a solution such as TMAH can be utilized.

(tetra-methyl-ammonium-hydroxide).

A Third Embodiment

In the recording head 50 of the first embodiment, the silicon substrate 1 has a crystal orientation of a <110> plane; however, the silicon substrate 1 is not limited thereto, but may have a crystal orientation of a <100> plane.

Figure 9A:
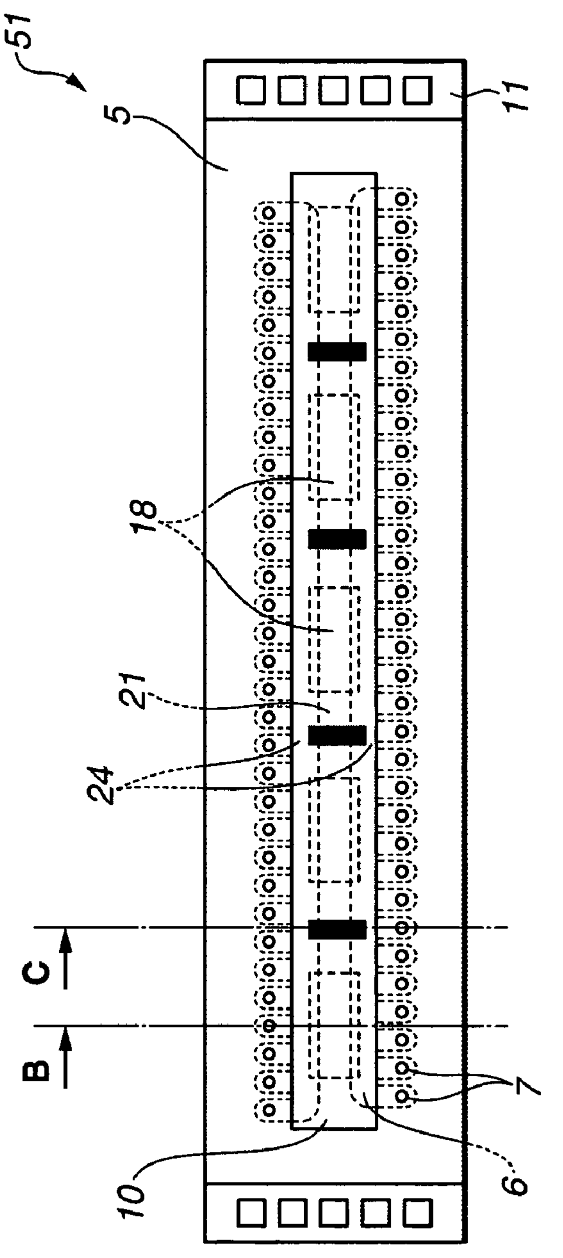
FIG. 9A is a top view of the recording head according to a third embodiment of the invention.
Figure 9B:
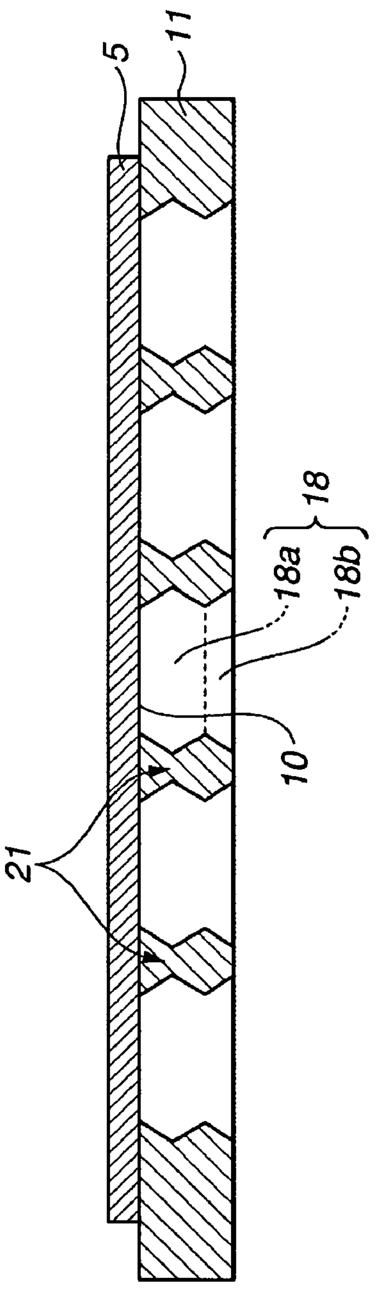
FIG. 9B is a longitudinally cut sectional view of the recording head.

FIGS. 9A and 9B show a recording head 51 having such a silicon substrate 1 according to a third embodiment. FIG. 9A is a top view, and FIG. 9B is a sectional view of the recording head cut along its longitudinal direction. The recording head 51 of the third embodiment is substantially identical with that of the first embodiment, except that only the silicon substrate 11 with respect to the recording head 50 of the first embodiment is changed, therefore elements and parts corresponding to those in FIGS. 3A and 3B are designated by identical reference numerals, description of which is, therefore, omitted.

The recording head 51 has a plurality of common liquid chambers 18 disposed so as to be arranged in the longitudinal direction of the silicon substrate 11, and a beam constructing section 21 is provided between the common liquid chambers 18 adjacent to each other.

The common liquid chamber 18 of the present embodiment is constructed by an upper liquid chamber 18*a* and a lower liquid chamber 18*b* as shown in the drawings. The lower liquid chamber 18*b* is shaped like a substantially truncated square pyramid, whereas the upper liquid chamber 18*a* is shaped like a combination of truncated square pyramids. Further, the upper liquid chamber 18*a* has an opening to an obverse surface of the substrate as ink supply ports 10, and the lower liquid chamber 18*b* has an opening to a reverse surface of the substrate, both of which have a rectangular shape of the same size. Moreover, the common liquid chamber 18 can be formed by one time etching process using an alkaline solution, as is the case with the first embodiment. The process will be described below as a fourth embodiment.

The beam constructing section 21 is formed between the common liquid chambers 18 adjacent to each other by partially leaving the silicon substrate 11, and formed so as to extend substantially in parallel with a narrow side direction of the silicon substrate 11. The beam constructing section 21 has an upper and a lower surface which are flush with the obverse and the reverse surfaces of the substrate 11, respectively. Further, the beam constructing section 21 has etching pits 24 at its upper surface as is the case with the first embodiment, therefore, the common liquid chambers 18 adjacent to each other can supply and receive the ink therebetween. A side surface of the beam constructing section 21 constructs apart of an inner wall surface of the common liquid chamber 18, accordingly its shape is complementary to the above-mentioned common liquid chamber 18.

Thus constructed recording head 51 of the present embodiment comprises the beam constructing section 21; therefore, it is capable of improving the mechanical strength of the silicon substrate 11 and providing the other effects same as the first embodiment.

A Fourth Embodiment

One example of a method of producing the recording head 51 of the third embodiment will be described as a fourth embodiment below with reference to FIGS. 10A to 10F and FIGS. 11A to 11F. FIGS. 10A to 10F are sectional views of the recording head 51 shown in FIGS. 9A to 9B cut along the line B, and FIGS. 11A to 11F are sectional views cut along the line C. Further, processes of FIGS. 10A to 10C, and processes of FIGS. 11A to 11C correspond respectively to those of FIGS. 5A to 5C, and those of FIGS. 6A to 6C which are already described. Therefore, description about them is omitted.

Figure 10A:
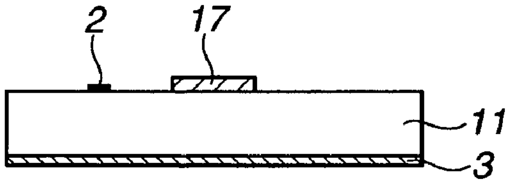
FIGS. 10A to 10F are views which illustrate a method of producing the recording head of FIGS. 9A to 9B as the third embodiment of the invention.
Figure 10B:
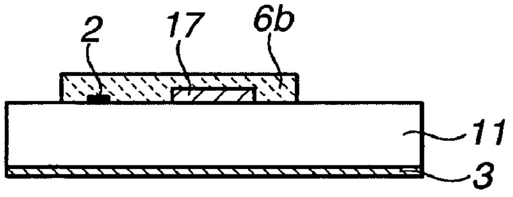
Figure 10C:
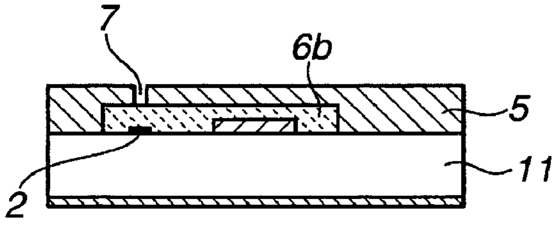
Figure 10D:
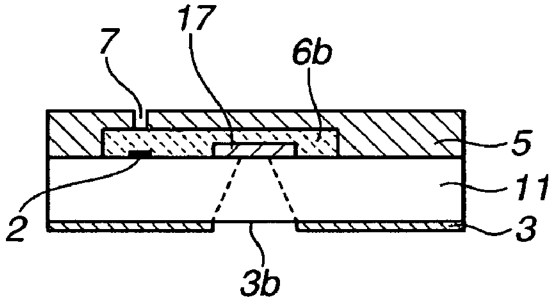
Figure 10E:
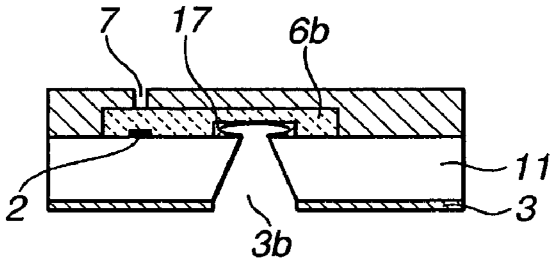
Figure 10F:
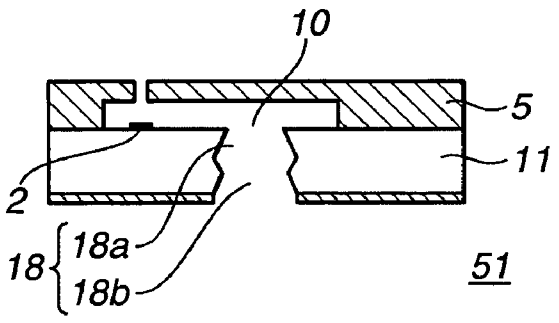
Figure 11A:
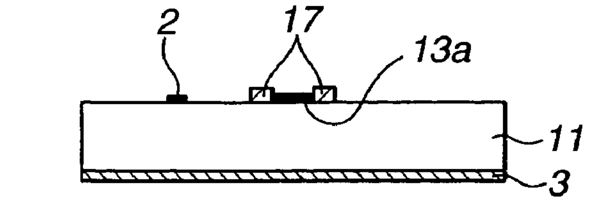
FIGS. 11A to 11F are views which illustrate a method of producing the recording head of FIGS. 9A to 9B.
Figure 11B:
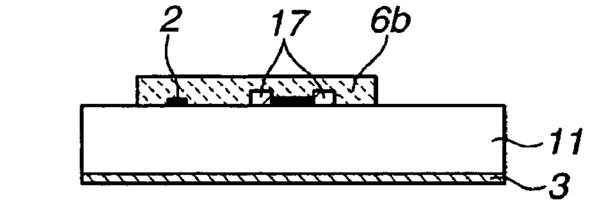
Figure 11C:
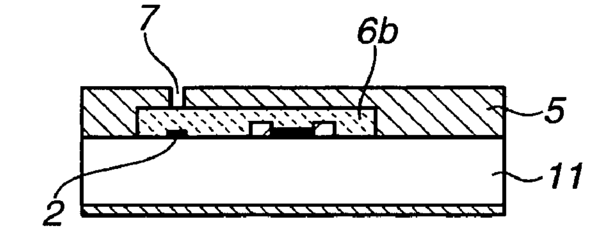

First, as shown in FIGS. 10A and 11A, a silicon substrate 11 having a crystal orientation of a <100> plane is provided, and the energy generating elements 2 and the dummy layer 17 are formed on the obverse surface of the silicon substrate 11 and the thermally oxidized film 3 as an etching mask on the reverse surface of the silicon substrate 11. The dummy layer 17 has the same shape as the first embodiment shown in FIG. 7A, that is, a shape corresponding to the ink supply port 10 and the etching pits 24 (refer to FIGS. 9A and 9B) of the present embodiment. Also in the fourth embodiment, the second etching mask shown in FIGS. 8A to 8E is omitted in FIGS. 10A to 10F, and FIGS. 11A to 11F, as is the case with the second embodiment.

Next, as shown in FIGS. 10B to 11B, the flow path resin layer 6*b* is applied to the energy generating layer 2 and the dummy layer 17 so as to cover them, then is subjected to patterning.

Next, as shown in FIGS. 10C to 11C, the coating resin layer 6 is formed so as to cover the flow path resin layer 6*b* and the discharge port 7 is provided.

Figure 11D:
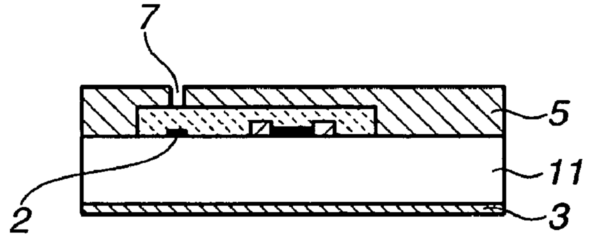

Next, as shown in FIGS. 10D and 11D, the opening portion 3*b* is formed at a part of the thermally oxidized film 3. In the first embodiment, the opening 3*b* is shaped like a parallelogram because the substrate used in the embodiment has a crystal orientation of a <110> plane, whereas in the fourth embodiment, the opening portion 3*b* is shaped like a rectangle because the substrate has a crystal orientation of a <100> plane. The opening portion 3*b* is substantially identical in size with a corresponding portion of the dummy layer 17 disposed on the upper surface, and has an outer circumferential edge which substantially matches with an outer circumferential edge of the dummy layer 17 when the whole substrate is viewed from the upper surface side. Due to such a construction, a position of a final form of the ink supply port 10 matches with that of the opening portion disposed at a lower portion of the common liquid chamber 18.

Figure 11E:
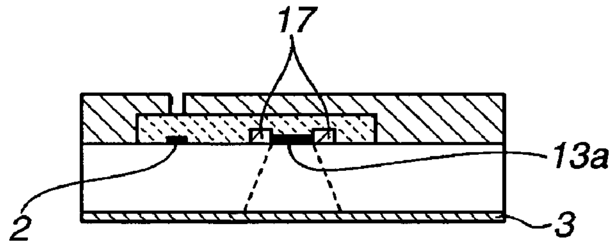
Figure 11F:
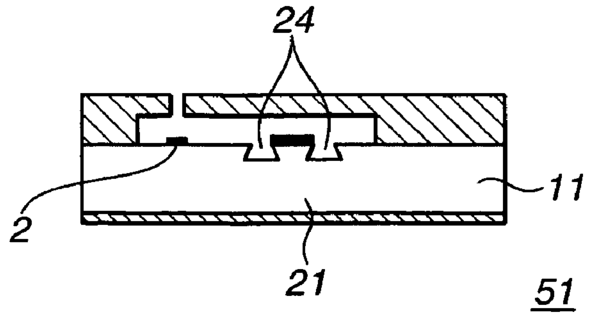

Next, as shown in FIGS. 10E and 11E, the etching is carried out using an alkaline solution with the thermally oxidized film 3 as an etching mask, thereby causing a part of the silicon substrate 11 to be etched so as to be tapered upward in a square pyramid manner at a portion shown in FIG. 10E, since the substrate has a crystal orientation of a <100> plane. On the other hand, the silicon substrate 11 is not etched at a portion shown in FIG. 11E, since the opening portion 3*b* is not formed on the thermally oxidized film 3.

Figure 1A:
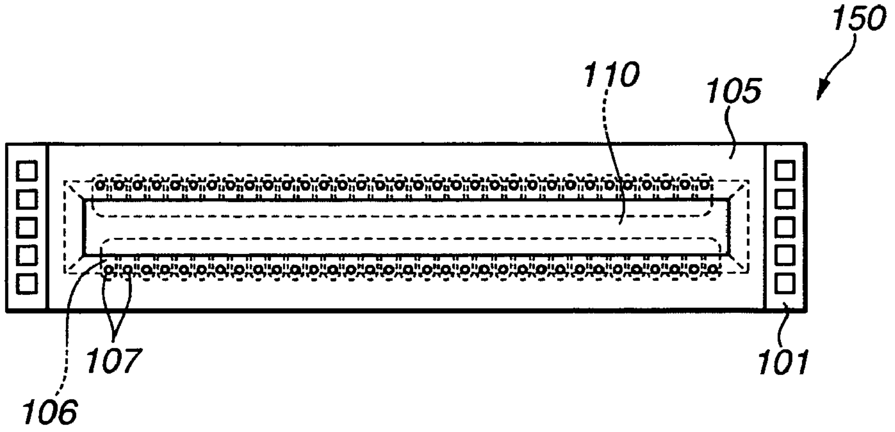
FIG.1A PRIOR ART
FIG. 1A is a top view of an exemplified construction of a conventional recording head.
Figure 1B:
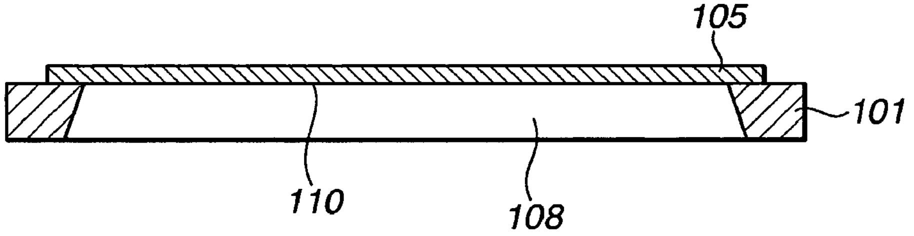
FIG.1B PRIOR ART
FIG. 1B is a longitudinal sectional view of the recording head.

As etching advances further, the dummy layer 17 starts to be removed. Since the etching speed is greater in the dummy layer 17 than in the silicon substrate 11, the dummy layer 17 is removed preferentially sideward. Also, by this etching the dummy layer 17 is removed from a portion shown in FIG. 1E.

Then, a space thus formed by removing the dummy layer 17 is filled with an alkaline solution, and now the etching advances from the obverse surface toward the reverse surface of the silicon substrate 11. Thus the upper liquid chamber 18*a* is formed at a portion shown in FIG. 10F. On the other hand, at a portion shown in FIG. 11F, the silicon substrate 11 is partially etched to form the etching pits 24 which corresponds to a portion at which the dummy layer 19 existed.

Thereafter, as is the case with the second embodiment, by dissolving out the flow path resin layer 6*b* in a manner like the prior art the recording head 51 of the fourth embodiment is produced.

The typical embodiment of the invention is described above, however the invention is not limited thereto, and can be variously changed. For example, in the second embodiment, the oxidized film 13*a* is formed in the opening portion 17*a* of the dummy layer 17 as an etching stopper layer to form the etching pits 23. However, it is not limited to the oxidized layer, and any other means may be employed insofar as it is capable of functioning as an etching stopper layer, such as a nitride film which is insoluble to an alkaline solution.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-188889 filed Jun. 25, 2004, which is hereby incorporated by reference herein in its entirety.

What is claimed is:

1. A method for producing an ink jet head, the ink jet head comprising a plurality of discharge ports for discharging ink, a plurality of ink flow paths for respectively supplying ink to the plurality of discharge ports, and an ink supply port for supplying ink to the plurality of ink flow paths, the ink jet head discharging ink supplied from the ink supply port through the plurality of discharge ports using a plurality of energy generating elements, the method comprising the steps of:

providing a substrate having a first principal plane on which the plurality of energy generating elements, a dummy layer for forming the ink supply port, and a first etching stopper layer suffounded by the dummy layer are formed;

forming a second etching stopper layer on a region of the first principal plane corresponding to the ink supply port;

forming, on the first principal plane, a flow path construction member for constructing the plurality of discharge ports and the plurality of ink flow paths;

placing, on a second principal plane opposed to the first principle plane of the substrate, an etching mask for forming a plurality of through holes, the etching mask being partitioned so as to include a region opposed to the first etching stopper layer;

performing etching of the substrate from the second principle plane; and removing the second etching stopper layer after the etching step to form the ink supply port, wherein, in the etching step, a groove is formed on the first principal plane, the groove having a region corresponding to the first etching stopper layer corresponding to the dummy layer left in an island-shaped manner, and the groove communicating with a plurality of through holes formed on the second principal plane.

2. The method for producing an ink jet head according to claim 1, wherein the etching step is performed by anisotropic etching using an alkali solution, and a member of the dummy layer has an etching speed with respect to the alkali solution which is faster than that of the substrate.

3. The method for producing an ink jet head according to claim 1, wherein the substrate comprises a silicon substrate having a crystal orientation of a <110> plane, and an opening portion of the etching mask is of a parallelogram.

4. The method for producing an ink jet head according to claim 1, wherein the substrate comprises a silicon substrate having a crystal orientation of a <100> plane, and an opening portion of the etching mask is of a rectangular.

5. The method for producing an ink jet head according to claim 1, wherein the substrate is made of silicon, and the first etching stopper layer is made of a silicon-contained compound.

6. The method for producing an ink jet head according to claim 5, wherein the first etching stopper layer comprises a silicon oxidized film, and the first etching stopper layer is formed at the same time that a field oxidized film is formed on the first principal plane of the silicon substrate.

7. The method for producing an ink jet head producing method according to claim 1, wherein a beam protruding toward the ink supply port at a region corresponding to the ink supply port is formed from the flow path construction member.

* * * * *